United States Patent [19]

Ou-Yang

[11] Patent Number: 4,818,577
[45] Date of Patent: Apr. 4, 1989

[54] SYNTHETIC LINER CAPABLE OF RESISTING CHEMICAL ATTACK AND HIGH TEMPERATURE

[75] Inventor: Daivd T. Ou-Yang, St. Paul, Minn.

[73] Assignee: Minnesota Mining and Manufacturing Company, St. Paul, Minn.

[21] Appl. No.: 87,666

[22] Filed: Aug. 20, 1987

[51] Int. Cl.⁴ .................. B65D 53/00; B32B 3/26; B32B 27/00
[52] U.S. Cl. .................. 428/36.5; 428/317.1; 428/317.7; 428/314.1; 428/314.3; 428/422; 428/473.5; 428/480; 428/215; 428/220; 428/447; 428/521; 428/492; 215/347; 215/348; 215/349
[58] Field of Search .......... 428/35, 318.4, 317.1, 428/319.7, 319.3, 319.9, 319.1, 347, 349, 317.7, 422, 220, 473.5, 447, 480, 521, 483, 215; 215/347, 348, 349

[56] References Cited

U.S. PATENT DOCUMENTS

| | | | |
|---|---|---|---|
| 2,384,761 | 11/1945 | Burgeni | 215/348 |
| 2,626,073 | 1/1953 | Miller et al. | 215/348 |
| 3,202,308 | 8/1965 | Botkin | 215/347 |
| 3,363,305 | 10/1968 | Botkin | 29/452 |
| 3,786,954 | 1/1974 | Shull | 215/347 |
| 3,819,460 | 6/1974 | Dukess | 215/347 |
| 3,917,100 | 11/1975 | Dukess | 215/347 |
| 3,963,845 | 6/1976 | Dukess | 215/347 |
| 3,976,217 | 8/1976 | Dukess | 215/347 |
| 3,995,087 | 11/1976 | Desanzo | 428/317.1 |
| 4,107,247 | 8/1978 | Dukess | 428/315 |
| 4,121,728 | 10/1978 | Tagalakis et al. | 215/347 |
| 4,206,165 | 6/1980 | Dukess | 428/315 |

FOREIGN PATENT DOCUMENTS 807005 2/1969 Canada.
2037718A 10/1979 United Kingdom.

Primary Examiner—Ellis P. Robinson
Assistant Examiner—James J. Seidleck
Attorney, Agent, or Firm—Donald M. Sell; Walter N. Kirn; David L. Weinstein

[57] ABSTRACT

A liner, suitable for use with caps for containers, comprising a layer of compressible polymeric foam, a layer of adhesive in contact with and coextensive with said foam layer, and a layer of polymeric film in contact with and coextensive with said layer of adhesive.

The liner shows good chemical resistance, good resistance to high temperatures, and good impermeability to gases.

14 Claims, 1 Drawing Sheet

SYNTHETIC LINER CAPABLE OF RESISTING CHEMICAL ATTACK AND HIGH TEMPERATURE

BACKGROUND OF THE INVENTION

1. Field of the Invention

This invention relates to liners for containers for packaging of foods, pharmaceuticals, chemicals, and the like.

2. Description of the Prior Art

A liner is a gasket disposed within the cap of a container for the purpose of improving the seal between the container and the cap.

The cost of packaging of liquid products or volatizable products is very high because, over time, the liquids or volatizable materials degrade conventional container liners or cause them to malfunction.

Currently, most packaging liners are made of foam derived from polyethylene, copolymers of ethylene and other olefin monomers, or blends of polyethylene and polyolefins compatible therewith. These liners are deficient for packaging liquids or volatizable products in three areas: chemical resistance, heat resistance, gas impermeability. Certain chemicals readily attack polyethylene foam, causing change in color, swelling, or degradation. For example, strong acids will destroy polyethylene foam, and oil or hydrocarbon solvents will swell polyethylene foam. Chemical attack will not only cause foam liners to have poor appearance but will also cause them to lose their functionality as liners, i.e. resealing of lined containers is impossible and products will pass through the liner. Temperatures in excess of 250° F., a temperature that is characteristic of retort-filling operations, distort polyethylene foam. Finally, polyethylene foam is very permeable to gases such as oxygen and nitrogen dioxide ($NO_2$) Accordingly, it is necessary to replace economical polyethylene liners with expensive liners for many liquid products and many volatizable products.

SUMMARY OF THE INVENTION

This invention provides a liner, suitable for use with caps for containers, which comprises (a) a layer of compressible polymeric foam, (b) a layer of adhesive in contact with and coextensive with said foam layer, and (c) a layer of polymeric film in contact with and coextensive with said layer of adhesive.

The liner of this invention is superior to liners of the prior art because it shows improved resistance to chemical attack, improved resistance to high temperatures, improved impermeability to gases, and improved appearance.

DETAILED DESCRIPTION

Figure 1:
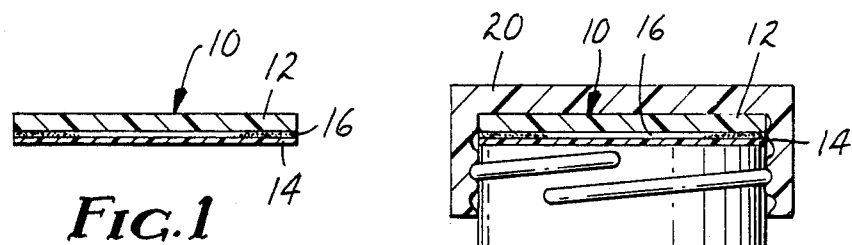
FIG. 1 is a cross-sectional view of the liner of this invention.

Referring now to FIG. 1, the liner is designated by the reference numeral 10, the layer of polymeric foam is designated by the reference numeral 12, the layer of polymeric film is designated by the reference numeral 14, and the layer of adhesive is represented by the reference numeral 16.

The layer of polymeric foam 12 must be compressible so that it can conform to the rim or lip of the container. As a guide for determining the degree of compressibility, for a 38 mm diameter liner having a thickness of 45 mils, applied to a container with a force of 20 in.-lb torque for one minute, it is preferred that the liner recover at least 30% (based on thickness of foam when not subjected to compressive force). The polymeric foam is preferably an open cell foam, typically having the fraction of open cells ranging from about 29% to about 67%, more preferably ranging from about 39% to 54%. The density of the foam typically ranges from about 0.3 to about 0.7 g/cm$^3$, preferably ranging from about 0.4 to about 0.6 g/cm$^3$, measured in accordance with ASTM D 1505-85. The crystallinity of the polymeric foam typically ranges from about 20% to about 60%. It is preferred that layer 12 be of sufficient thickness to allow the cap of the container to be spaced appropriately from the top of the neck of the container. However, layer 12 cannot be so thick that the container cannot be properly closed. Preferably, the thickness of layer 12 ranges from about 2 mil to about 60 mil. More preferably, the thickness ranges from about 15 mil to about 40 mil. It should be noted, however, that thickness of layer 12 depends on the depth of the cap and length of the neck of the container. The preferred materials for layer 12 are polymers and copolymers of olefins, such as, for example, polyethylene, polypropylene, ethylene-vinyl acetate copolymer, and blends of the foregoing polymers. Other polymeric foam materials that are suitable for layer 12 include polyurethane and polyvinyl chloride.

Because of conditions encountered during filling and storage of containers, it is preferred that layer of polymeric film 14 have a high melting temperature, good gas impermeability, and good chemical resistance. Preferably the thickness of film layer 14 ranges from about 0.2 mil to about 5 mil. The preferred materials for film layer 14 include crystalline and semi-crystalline polyesters, polyester coated with saran, silicones, polytetrafluoroethylenes, and polyimides. The term "saran" means polymers with high vinylidene chloride content. The polymeric film is preferably heat resistant, in order to withstand the heat of the filling operation, particularly under conditions of high pressure. Layer of polymeric film 14 is preferably comprised of polymeric material having a melting point of 130° C. or higher, in order that it not soften or melt during the container filling operation, which is likely to be conducted at high temperatures. The polymeric material typically has an oxygen transmission rate as low as 5 cc/100 sq.in./day. The maximum oxygen transmission rate of the polymeric film should not exceed 15 cc/100 sq.in./day when used for food products. If the polymeric film is used for products that are not sensitive to oxygen, the oxygen transmission rate can be much higher, e.g. not in excess of 60 cc/100 sq.in./day. It is also preferred that film layer 14 be capable of resisting oils and chemicals typically used in food, cosmetic, and pharmaceutical applications. The polymeric material is preferably capable of resisting attack by chemicals such as hydrocarbon solvents, e.g. heptane, toluene, acetone, alcohol, acetic acid, for at least five weeks at a temperature of 100° F. Commercially available polymers that are suitable for the layer of polymeric film include "Scotchpak 96" and "Scotchpak 125", both of which are made of polyethylene terephthalate bearing a layer of heat sealable adhesive or heat sealable film and are available from Minnesota Mining and Manufacturing Company.

Adhesives that are preferred for bonding foam 12 layer to film layer 14 include pressure-sensitive adhesives, natural rubber-based adhesives, synthetic rubber-based adhesives, acrylic polymer-based adhesives, and polyolefin-based adhesives, e.g. copolymers of ethylene and vinyl acetate, copolymers of ethylene and acrylic acid, copolymers of ethylene and ethyl acrylate, polyethylene, and polypropylene. Adhesives that are used in embodiments of this invention where polyester film and polyolefin foam are used will typically require radiation, e.g. ultraviolet radiation, electron-beam radiation, corona radiation, to form a strong permanent chemical bond between polyester film layer 14 and adhesive layer 16. Layer of polymeric foam 12 and layer of polymeric film 14 can be bonded together by means of heat, pressure, or a combination of heat and pressure. If a destructive bond is desired, adhesive layer 16 can be extruded on layer of polymeric film 14 and cured, e.g. by radiation, to form a chemical bond between film layer 14 and adhesive layer 16. The film/adhesive laminate can then be heat pressed onto foam layer 12 or foam layer 12 can be extruded onto the film/adhesive laminate.

Because there is a chemical bond between film layer 14 and adhesive layer 16 of the film/adhesive laminate, the adhesive bond between film layer 14 and adhesive layer 16 is stronger than the cohesive strength of foam layer 12. Upon peeling film layer 14 from foam layer 12, foam layer 12 will undergo cohesive failure, and the bond holding the liner together will be destroyed.

Figure 2:
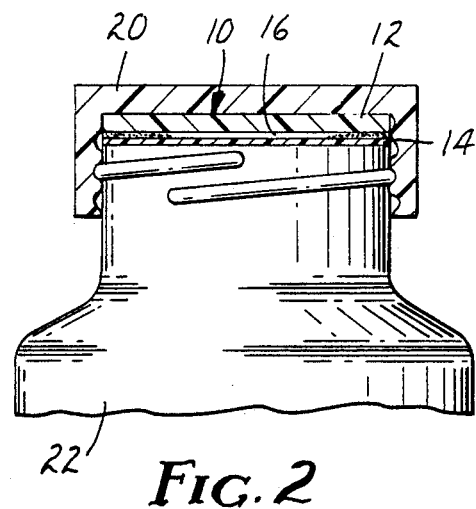
FIG. 2 is a vertical sectional view of a cap and liner sealed to a container in accordance with the present invention.
Figure 3:
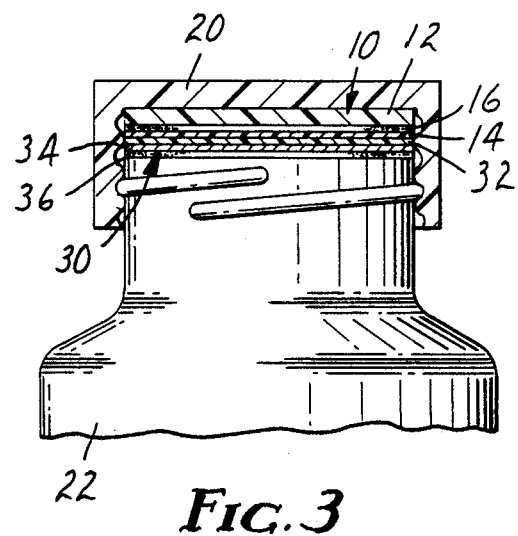
FIG. 3 is a vertical sectional view of a cap, liner, and innerseal sealed to a container in accordance with the present invention.

The liner of this invention can be used as a dual purpose liner/innerseal as shown in FIG. 2. The liner 10 can be die cut, most commonly in the shape of a disc, and then inserted into the bottle cap 20. The liner 10 can be permanently adhesively bonded onto the inside of the cap 20 or it can be loosely inserted onto the inside of the cap 20, which can be specially designed to retain the liner. The cap can then be applied to the bottle 22, as by screwing, as shown in FIG. 2, or by snapping. Alternatively, the liner can be used in conjunction with an innerseal, such as, for example, an induction innerseal or a non-heat sealable innerseal. FIG. 3 shows the liner 10 of this invention used with an induction innerseal 30. Induction innerseal 30 consists of a backing 32, typically made of paper, polymeric film, or polymeric foam, a foil layer 34, and a layer of adhesive 36, which can be heat-sealable or non-heat sealable. The layer of adhesive 36 is in contact with both the container 22 and the foil layer 34.

If an innerseal is employed, it can be double cut with the liner by means of a die and inserted into the cap simultaneously with the liner. The liner is in face-to-face contact with the inside of the cap. The innerseal can be adhesively bonded to the liner or not bonded to the liner.

The liner of this invention has better appearance, better heat resistance, better chemical resistance, and better gas impermeability than conventional liners made of polyolefin foam. Additional advantages include absence of dust and absence of wet-out caused by liquid products which are present when pulp board liners are used.

The following, non-limiting example was conducted to compare the liner of the present invention with conventional liners that are commonly used in glass containers.

EXAMPLE 1

The liner of this example was prepared by extruding low density polyethylene (Eastman 15-50p, Eastman Chemical Co.) with a coat-hanger type drop die at a die temperature of about 470° F. onto biaxially oriented polyethylene terephthalate film and then subjecting the thus formed laminate to ultraviolet radiation (50 lamps at 40 watts/lamp) at about 50 ft./min. web speed in order to form a bond between the polyethylene layer and the polyethylene terephthalate film. The polyethylene layer was extruded at an orifice opening of 0.5 mil. The polyethylene terephthalate film had a thickness of 0.47 mil. The resulting irradiated composite was then laminated by means of heat to a web of polyethylene foam having a thickness of 40 mil. The polyethylene layer was in face-to-face contact with the layer of polyethylene foam. The liner was then punched from the web to form a disk of a shape to be placed in a cap. The liner was placed in the cap but not bonded thereto. No innerseal was used. The configuration of the liner, cap, and container was as shown in FIG. 2. The cap was then screwed onto a container made of glass.

The liner of this example was compared with liners made of (a) polyolefin foam and (b) polyethylene terephthalate (PET)/pulp composite. The three liners were evaluated for heat resistance, chemical resistance, and resistance to passage of gas. The results are shown in The liner of Example 1 was superior to the liner of polyolefin foam with respect to oxygen transmission, heat resistance, and chemical resistance. The liner of Example 1 was superior to the liner of PET/pulp composite with respect to chemical resistance. Various modifications and alterations of this invention will become apparent to those skilled in the art without departing from the scope and spirit of this invention, and it should be understood that this invention is not to be unduly limited to the illustrative embodiments set forth herein.

What is claimed is:

1. Liner suitable for a cap for a container consisting of:
    (a) a layer of compressible polymeric foam, said layer of foam comprising a polymer or copolymer of olefin,
    (b) a layer of adhesive in contact with and coextensive with said layer of foam, and
    (c) a layer of polymeric film in contact with and coextensive with said layer of adhesive, said layer of film being made of a material selected from the group consisting of crystalline and semicrystalline polyesters, silicones, polytetrafluoroethylenes, and polyimides.

2. The liner of claim 1 wherein said layer of polymeric foam has a thickness ranging from about 2 mil to about 60 mil.

3. The liner of claim 1 wherein said layer of polymeric foam is sufficiently compressible that said liner having dimensions of 38 mm and a thickness of 45 mils can recover at least 30% when a force of 20 in.-lb. of torque is applied to said cap and said container for one minute.

4. The liner of claim 1 wherein said polymeric foam is an open cell foam.

5. The liner of claim 1 wherein said layer of polymeric film has a thickness ranging from about 0.2 mil to about 5 mils.

6. The liner of claim 1 wherein said layer of polymeric film is comprised of polymeric material having a melting point of at least 130° C.

7. The liner of claim 1 wherein said layer of polymeric film has an oxygen transmission rate not in excess of 60 cc/100 sq. in./day.

8. The liner of claim 1 wherein said layer of adhesive comprises a pressure-sensitive adhesive.

9. The liner of claim 1 wherein said layer of adhesive comprises a polyolefin-based adhesive.

10. The liner of claim 1 wherein said layer of adhesive comprises a rubber-based adhesive.

11. The liner of claim 1 wherein said layer of adhesive comprises an acrylic polymer-based adhesive.

12. A cap for a container, said cap having the liner of claim 1 inserted therein.

13. A container having a cap, said cap having the liner of claim 1 inserted therein.

14. The liner of claim 1 in the shape of a disc.

* * * * *

UNITED STATES PATENT AND TRADEMARK OFFICE
CERTIFICATE OF CORRECTION

PATENT NO. : 4,818,577

DATED : April 4, 1989

INVENTOR(S) : David T. Ou-Yang

It is certified that error appears in the above-identified patent and that said Letters Patent is hereby corrected as shown below:

In Column 4, Line 31, please insert the following text after "The results are shown in": --Table I.

TABLE I

| Liner | Oxygen transmission[1] (cc/100 sq.in./day) | Heat resistance | Removal torque[2] | Chemical resistance |
|---|---|---|---|---|
| Example 1 | 5.04 | up to 250°C | 15 | Resists most chemicals |
| Polyolefin foam | 42.68 | up to 100°C | 19 | Swells or discolors in presence of many chemicals |
| PET/pulp composite | 0.52 | up to 250°C | 13 | Liquid contaminates the pulp side of the liner, resulting in delamination |

[1] Measured in accordance with ASTM D-3985-81
[2] Measured in accordance with ASTM 3198-84

Signed and Sealed this

Seventh Day of August, 1990

Attest:

HARRY F. MANBECK, JR.

Attesting Officer

Commissioner of Patents and Trademarks